(12) United States Patent
Schehrer (10) Patent No.: US 11,879,522 B2
(45) Date of Patent: Jan. 23, 2024

(54) SLIDE RAIL FOR A BELT MEANS OF A BELT DRIVE

(71) Applicant: Schaeffler Technologies AG & Co. KG, Herzogenaurach (DE)

(72) Inventor: Nicolas Schehrer, Eschau (FR)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 529 days.

(21) Appl. No.: 16/977,511

(22) PCT Filed: Feb. 5, 2019

(86) PCT No.: PCT/DE2019/100119
§ 371 (c)(1),
(2) Date: Sep. 2, 2020

(87) PCT Pub. No.: WO2019/170187
PCT Pub. Date: Sep. 12, 2019

(65) Prior Publication Data
US 2020/0393024 A1    Dec. 17, 2020

(30) Foreign Application Priority Data

Mar. 5, 2018  (DE) .................. 102018104997.8
Jun. 6, 2018  (DE) .................. 102018113401.0

(51) Int. Cl.
| F16H 7/18 | (2006.01) |
| F16H 9/12 | (2006.01) |
| F16H 9/18 | (2006.01) |
| F16H 9/24 | (2006.01) |

(52) U.S. Cl.
CPC .............. *F16H 9/125* (2013.01); *F16H 7/18* (2013.01); *F16H 9/18* (2013.01); *F16H 9/24* (2013.01)

(58) Field of Classification Search
CPC ..... F16H 7/18; F16H 9/24; F16H 9/18; F16H 7/08
USPC ........................................................ 474/140
See application file for complete search history.

(56) References Cited

U.S. PATENT DOCUMENTS

| 7,329,196 B2* | 2/2008 | Konno | F16H 7/18 |
| | | | 474/140 |
| 8,057,336 B2* | 11/2011 | Wodtke | F16H 7/18 |
| | | | 474/18 |
| 8,376,883 B2* | 2/2013 | Inoue | F16H 9/24 |
| | | | 474/140 |

(Continued)

FOREIGN PATENT DOCUMENTS

| CN | 104662333 A | 5/2015 |
| CN | 107208757 A | 9/2017 |

(Continued)

*Primary Examiner* — Michael R Mansen
*Assistant Examiner* — Stephen A Reed (57) ABSTRACT

A slide rail for damping a first side of a belt device of a belt drive includes an outer slide surface, an inner slide surface, an axial web, and a support-receiving element. The inner slide surface is oriented parallel to, and away from, the outer slide surface, and includes a rear side. The axial web has an axial extension disposed on the rear side. The support-receiving element is designed to orient the outer slide surface and the inner slide surface to damp the first side. In an example embodiment, the slide rail includes a transverse rib connecting the inner slide surface to the axial web.

17 Claims, 2 Drawing Sheets

(56) References Cited

U.S. PATENT DOCUMENTS

| | | | | |
|---|---|---|---|---|
| 9,605,733 | B2* | 3/2017 | Geibel | F16H 7/18 |
| 9,777,808 | B2* | 10/2017 | Urbanek | F16H 9/16 |
| 9,863,523 | B2* | 1/2018 | Stocks | F16H 9/14 |
| 10,208,839 | B2* | 2/2019 | Werny | F16H 9/18 |
| 2009/0127049 | A1* | 5/2009 | Krause | F16H 45/02 |
| | | | | 192/3.29 |
| 2011/0152019 | A1* | 6/2011 | Gantner | F16H 9/24 |
| | | | | 474/8 |
| 2014/0106913 | A1* | 4/2014 | Adams | F16H 7/08 |
| | | | | 474/110 |
| 2014/0235390 | A1* | 8/2014 | Urbanek | F16H 7/18 |
| | | | | 474/140 |
| 2015/0176684 | A1* | 6/2015 | Werny | F16H 9/125 |
| | | | | 474/140 |
| 2017/0152922 | A1* | 6/2017 | Kato | F16H 7/18 |

FOREIGN PATENT DOCUMENTS

| | | | | |
|---|---|---|---|---|
| DE | 10017005 | A1 | 10/2000 | |
| DE | 102012213762 | A1 * | 2/2013 | F16H 7/18 |
| DE | 102013213163 | A1 | 1/2014 | |
| WO | 2014012741 | A1 | 1/2014 | |
| WO | 2015021986 | A1 | 2/2015 | |
| WO | 2015039661 | A1 | 3/2015 | |
| WO | 2016127983 | A1 | 8/2016 | |
| WO | WO-2017054808 | A1 * | 4/2017 | F16H 61/66272 |

\* cited by examiner

Fig. 3

SLIDE RAIL FOR A BELT MEANS OF A BELT DRIVE

CROSS-REFERENCE TO RELATED APPLICATIONS

This application is the United States National Phase of PCT Appln. No. PCT/DE2019/100119 filed Feb. 5, 2019, which claims priority to German Application Nos. DE102018104997.8 filed Mar. 5, 2018 and DE102018113401.0 filed Jun. 6, 2018, the entire disclosures of which are incorporated by reference herein.

TECHNICAL FIELD

The disclosure relates to a slide rail for a belt means of a belt drive, a belt drive having such a slide rail, a drive train having such a belt drive, and a motor vehicle having such a drive train.

BACKGROUND

A belt drive, also referred to as a cone pulley belt drive or CVT (continuous variable transmission), for a motor vehicle comprises at least one first cone pulley pair arranged on a first shaft and a second cone pulley pair arranged on a second shaft, as well as a belt means provided for torque transmission between the cone pulley pairs. A cone pulley pair comprises two cone pulleys which are oriented with corresponding conical surfaces to one another and are axially movable relative to one another.

Such a belt drive regularly comprises at least a first cone pulley pair and a second cone pulley pair, each having a first cone pulley that can be displaced along the shaft axis, also referred to as a loose pulley or a travel pulley, and a second cone pulley that is fixed in the direction of the shaft axis, also referred to as a fixed pulley, wherein the belt means provided for transmitting torque between the cone pulley pairs as a result of a relative axial movement between the loose disc and the fixed disc as a result of the conical surfaces runs on a variable radius of action, i.e. with a variable running radius. As a result, a different rotational speed transmission ratio and torque transmission ratio can be continuously adjusted from one cone pulley pair to the other cone pulley pair.

Such belt drives have long been known, for example from DE 100 17 005 A1 or WO 2014/012 741 A1. During operation of the belt drive, the belt means is shifted in a radial direction between an inner position (small radius of action) and an outer position (large radius of action) by means of the relative axial movement of the cone pulleys, thus on the cone pulley pairs. The belt means forms a side between the two cone pulley pairs, wherein according to the configuration and the direction of rotation of the cone pulley pairs, one of the sides forms a driving side and the other side forms a slack side or a load side and an empty side.

In such belt drives, at least one damping device is provided in the space between the cone pulley pairs. Such a damping device can be arranged on the driving side and/or on the slack side of the belt means and is used to guide and thus to limit vibrations of the belt means. Such a damping device is to be designed primarily with regard to an acoustically efficient traction means guide (belt means guide). The length of the system for guiding the belt means and the stiffness of the damping device are decisive influencing factors. A damping device is designed, for example, as a slide shoe or as a sliding guide with only one-sided, usually space-dependent (transverse to the belt means) inside contact surfaces, i.e. between the two sides. Alternatively, the damping device is designed as a slide rail with a contact surface on both sides, i.e. both on the outside, i.e. outside of the belt loop formed, and also on the inside contact surface for the relevant side of the belt means.

The direction perpendicular to the (respective) side and pointing from the inside to the outside or vice versa is called the transverse direction. The direction perpendicular to the sides and pointing from one cone pulley to the other cone pulley of a cone pulley pair is referred to as the axial direction. Thus, this is a direction parallel to the axes of rotation of the cone pulley pairs. The direction in the (ideal) plane of the (respective) side is called the running direction or the opposite running direction.

The damping device is mounted by means of a pivot bearing with a pivot axis, which enables the damping device to be pivoted about the pivot axis. In some applications, the damping device can also be moved transversely, so that the damping device follows a (steeper oval) curve which deviates from a circular path around the pivot axis. The pivot axis thus forms the center of a (two-dimensional) polar coordinate system, wherein the (pure) pivot movement thus corresponds to the change in the polar angle and the transverse movement corresponding to the change in the polar radius. This translational movement which is overlaid, i.e. superimposed, on the pivot movement is summarized below for the sake of clarity under the term pivot movement. The pivot axis is oriented transversely to the running direction of the belt means, i.e. axially. This ensures that when the radii of action of the belt drive are adjusted, the damping device can follow the resulting new (tangential) orientation of the belt means.

To increase the damping effect and thus (primarily) reduce noise emissions, the aim is to extend the slide surfaces as long as possible and to achieve the highest possible stiffness of the slide surfaces. This is difficult given the requirement for a smallest possible installation space and at the same time the need to adjust the slide rail.

SUMMARY

The disclosure relates to a slide rail for a belt means of a belt drive, including at least the following components: an outer slide surface; an inner slide surface, which is oriented parallel to, and away from, the outer slide surface; and a support-receiving element. The slide surfaces are designed to be applied to a side of a belt means in a damping manner and the support-receiving element is designed to orient the slide surfaces according to the orientation of the side to be damped.

An axial web of the slide rail has an axial extension provided on the back of the inner slide surface.

In the following, reference is made to the spatial directions indicated at the beginning, which are to be understood as a coordinate system moving with the side if the axial direction, transverse direction, or the running direction and corresponding terms are used without explicitly indicating otherwise.

According to the prior art, the slide rail is designed for the damping of a belt means, for example a link chain or a belt, of a belt drive with two cone pulley pairs. This means that the slide rail is set up for one of the two sides of the belt means, for example in the case of a CVT for the driving side, which forms the load side. Alternatively, the empty side or both sides are each guided by means of such a slide rail. If guiding the side is referred to, this also means damping the side because the belt means accelerates the upstream cone pulley pair in the running direction in the side in a direction that deviates from the ideal tangential direction of the set radii of action of the two cone pulley pairs transversally outward. This results in shaft vibrations that impair efficiency and lead to noise emissions.

For guiding or damping, the slide rail has an outer slide surface, which is applied to the side to be guided transversely from the outside, and an inner slide surface, which is applied to the side to be guided transversely from the inside, and which is oriented parallel to, and away from, the outer slide surface. The slide surfaces thus form contact surfaces which extend in the running direction and counteract the transversely oriented amplitude of the shaft vibrations.

A support-receiving element is provided so that the slide rail can follow the (ideal) running direction that is oriented with the two cone pulley pairs according to the radii of action set. This support-receiving element is pivotably mounted on an axially oriented pivot axis formed by a bearing, for example in the manner explained at the outset. As a result, the slide rail is set up in such a way that the two slide surfaces follow the respective orientation of the tangential direction, i.e. the running direction of the side to be guided, and applied to the outside or inside of the side in a damping manner.

In this slide rail, an axial web is provided on the back of the inner slide surface, i.e. on the inside. This axial web extends in the running direction, for example as a curve away from the inner slide surface or towards an inclined or bent curve. The axial web, however, protrudes laterally, i.e. with an axial extension from a stiffening rib. Such a stiffening rib is, for example, conventionally designed and has an extension in the running direction which corresponds to a large part, for example 80%, or to the entire extension of the inner slide surface. The stiffening rib serves to stiffen the inner slide surface. With the stiffening rib and the axial web, a type of T-beam is thus formed on the back of the slide surface, or the sliding element forming the slide surface with a transverse extension on the back of the side slide surface.

In one embodiment of the slide rail with two rail halves, which can be joined together axially, for example symmetrically, at least one of the rail halves has a C-shape (axial web forms the additional horizontal line) instead of an L-shape (vertical line corresponds to stiffening rib and base line corresponds to the slide surface). According to one embodiment, the axial web tapers in the running direction from a center, for example at the support-receiving element, to an end of the slide surface, i.e. to an inlet side and/or an outlet side. As a result, the slide rail can be extended further into the area of a cone pulley pair compared to with no tapering (and an equally wide maximum axial extension).

In one embodiment, the stiffening rib is formed from one or a plurality of individual ribs which are axially spaced apart from one another, at least over part of the transverse extension. In one embodiment, one or more openings are provided in the stiffening rib or one of the ribs of a multi-part stiffening rib.

Although the axial extension is important due to the free space tapering to the respective axis of rotation of the cone pulley pairs, surprisingly it was found that the stiffening effect achieved by the axial web is very large. In fact, while maintaining or even increasing the conventional stiffness of the inner slide surface, the structural depth of the stiffening rib in the transverse direction can be reduced in comparison with a conventional embodiment in such a way that the slide surface can be extended in the running direction compared with a conventional embodiment. As a result, the inner slide surface begins closer to the transition from the wrapped around portion of the radius of action to the tangential side. This means that the amplitude of the wave oscillation does not build up as much and a significantly improved damping of the guided side is achieved. Alternatively or additionally, the use of materials and thus costs for producing such a slide rail can be reduced.

Another effect that can be achieved is that the minimum transverse distance of the inner slide surface to the limit of a transverse movement of the support-receiving element on a pivot bearing can be shortened. This can be achieved as a result of a possible reduction in the transverse overall height of the stiffening device, for example by shortening the stiffening rib in comparison to a conventional embodiment. The consequence of this is that the maximum transverse movement of the slide rail can be extended so that the overlap of the side to be guided in the running direction can be increased with the above-mentioned advantageous effects by means of an improved tracking of the slide surfaces that is now possible.

In addition, it can surprisingly be achieved that the relevant component inertia of the slide rail is reduced when the radii of action are adjusted. The efficiency can thus be increased and/or the actuating forces can be reduced.

In an example embodiment, the slide rail is produced by means of injection molding, e.g., from a possibly fiber-reinforced plastic with good dry sliding properties. Such a plastic is, for example, a polyamide. Two rail halves to be joined together, by positively fitting, for example, are formed. The two rail halves are to be joined to a slide rail, e.g., in one plane with the axial direction as the surface normal in the center of the belt means. Such a rail half is may be suitable for production by means of two-part injection molding matrices which are frequently reusable and suitable for large-scale production, despite the fact that the permissible manufacturing tolerances are lower.

According to an example embodiment of the slide rail, at least one transverse rib connects the inner slide surface and the axial web to one another. According to this embodiment, a transverse rib is provided which has an axial extension and may extend axially out of the stiffening rib like the axial web. The transverse rib connects the inner slide surface and the axial web axially to one another outside of the axial extension of the stiffening rib. A truss stiffening for the slide surface is thus formed axially outside of the axial extension of the stiffening rib. The transverse overall height of the stiffening device can thus be further reduced and/or the stiffness of the inner slide surface can be increased.

According to an example embodiment of the slide rail, the slide rail includes two rail halves. Each of the rail halves is constructed identically and forms one half of the outer slide surface and the inner slide surface. The rail halves can be connected to one another by means of at least two bayonet-type closures, each including a receiving opening and a corresponding connecting hook.

In this embodiment, two identical rail halves are provided, as is already known in some embodiments. During assembly, these can be guided axially to one another on the side to be guided, or one half of the rail is already installed and the other can be axially guided. A connecting hook (due to identical construction per rail half) is inserted into a corresponding receiving opening of the other rail half. Alternatively, only one connecting hook with a corresponding receiving opening or non-identical connecting hook with a corresponding receiving opening is provided which deviates from the identical construction. The rail halves are then displaced in opposite directions in the running direction, so that the at least one connecting hook engages behind an undercut in the corresponding receiving opening. As a result, a positive fit, e.g., a force fit with an axial force component, is formed between the two rail halves. The inner slide surface and the outer slide surface are then each composed of one half of the corresponding component of the slide rail.

In an example embodiment, the at least one transverse rib is arranged between the support-receiving element and the relevant receiving opening in the running direction of the side to be damped, as described above. In this embodiment, the respective receiving opening, which is arranged on the rear side of the inner slide surface, is closer to the inlet side and the outlet side of the slide rail in the running direction than the transverse rib. So far, the weakening of the (conventional) stiffening device without an axial web and transverse rib through the receiving opening was so great that it must be arranged far to the center, i.e. in the running direction of the support-receiving element. The distance in the running direction between two bayonet-type closures is thus small, and thus a low stiffness against a twisting about an axial axis of the two rail halves relative to one another is small, or due to the play of the positive fit, a twisting angle is large. This impairs the damping effect.

As a result of the now possible displacement of the bayonet-type closure in the running direction away from the center or the support-receiving element, a possible twisting angle can be reduced per se with the same play or the same stiffness of the closure. This improves the damping effect.

In all of the aforementioned embodiments, the axial extension of the axial web and/or the transverse rib may be formed symmetrically to a central plane with the axial direction as the surface normal, for example the joining plane in a two-part embodiment of the slide rail with identical rail halves. This is advantageous with regard to the identical construction and/or the design of the slide surface.

Also in all of the above-mentioned embodiments, alternatively or additionally, it is possible to reduce the stiffness of the outer slide surface, at least on the inlet side, compared to a conventional embodiment, because a consequent lower energy consumption on the inlet side by means of the outer slide surface can at least be compensated for by means of a result of the higher stiffness or the earlier application of the inner slide surface. The reduction in the stiffness of the outer slide surface can be achieved, for example, at least on the inlet side, by reducing the transverse overall height on the rear side of the outer slide surface, i.e. transversely to the outside. In addition to an extension of the inner slide surface, this also enables an extension of the outer slide surface in the running direction, so that a large amount of energy can be drawn from the inlet side before the occurrence of a larger amplitude due to the stiff and/or early application of the slide surfaces and thus energy can be removed and an improved damping can be achieved.

According to an example embodiment of the slide rail, the axial web forms an inner boundary of the stiffening device of the inner slide surface. The axial web extends over at least 80% of the total extension of the inner slide surface, and may be straight. According to this embodiment, the stiffening device, including, for example, the stiffening rib and the axial web and possible the transverse rib, is delimited inwards by the axial web in the transverse direction, i.e. to the other side (not guided by this slide rail). The support-receiving element or additionally a rib arranged close to the support-receiving element up to a maximum of 40% of the total extension of the inner slide surface extends inward beyond the axial web.

The axial web may extend over at least 80%, e.g., over 90%, of the total extension of the inner slide surface. A large stiffening is achieved in this way. As a result of the possible reduction of the transverse depth of the stiffening rib of the stiffening device of the inner slide surface already mentioned, an extension of the inner slide surface is nevertheless possible in comparison with a conventional embodiment of a slide rail. In one embodiment of the slide rail, the extension of the axial web is arranged symmetrically with respect to the pivot axis or the support-receiving element. In another embodiment, the axial web extends towards the inlet side of the side.

The inlet side of the side is the side on which the side to be guided leaves the cone pulley pair and then runs into the slide rail. This is where the wave vibration resulting from the escape acceleration occurs with the greatest transverse forces. At the outlet side of the side, i.e. where the side to be guided runs out of the slide rail and enters the other cone pulley pair, the transverse forces are damped due to the damping distance of the slide rail, the radial tensile force into the radius of action and the side tension (in the running direction), and are therefore lower than on the inlet side. In contrast, a symmetrical embodiment has the advantage that manufacture which is independent of the running direction is possible and/or the slide rail has a higher level of safety during assembly and/or can be used on both sides.

In an example embodiment, the axial web is straight, for example parallel to the running direction. This simplifies the manufacture and design of the stiffening device, for example with regard to the deformation behavior of the inner slide surface.

According to a further aspect, the disclosure relates to a belt drive for a drive train, including at least the following components: a drive input shaft with a first cone pulley pair; a drive output shaft with a second cone pulley pair; a belt means by means of which the first cone pulley pair is connected to the second cone pulley pair in a torque-transmitting manner; and at least one slide rail according to an embodiment according to the above description. The at least one slide rail is applied to a side of the belt means for damping the belt means with the slide surfaces.

With the belt drive proposed here, a torque can be transmitted from a drive input shaft to a drive output shaft, and vice versa, in a step-up or step-down manner. The transmission can be continuously adjusted, at least in some areas. A belt drive is, for example, what is termed a CVT (continuous variable transmission) with a traction means or a belt drive with a thrust link belt. The belt means is, for example, a multi-link chain. The belt means is shifted in opposite directions on the cone pulley pairs from radially inside to the outside and vice versa, so that a radius of action with a changed running radius is established on a respective cone pulley pair. The ratio of the radii of action results in a transmission of the torque to be transmitted. The two radii of action are connected to one another by means of an upper and a lower side, namely a load side, also known as a driving side or slack side, and an empty side of the belt means.

In the ideal state, the sides of the belt means form a tangential orientation between the two radii of action. This tangential orientation is superimposed by induced wave vibrations, for example caused by the finite division of the belt means as well as due to the premature leaving of the radius of action due to the escape acceleration of the belt means.

The slide rail is designed to be applied to the slide surfaces thereof a corresponding contact surface of a side to be damped, for example the load side, in such a way that such shaft vibrations are suppressed or at least damped. Furthermore, for one application, a transverse guide, i.e. in a plane parallel to the formed loop of the belt means, is provided on one or both sides of a guide surface. A slide channel is thus formed. The side is thus guided in a parallel plane to the slide surfaces and the running direction of the side lies in this parallel plane. For the best possible damping, the slide surface is designed to be applied as tightly as possible on the side of the belt means. To do this, the slide surface must be as stiff as possible. So that the damping device can follow the movement of the side, a pivot bearing is provided, on which the damping device is seated with the pivotable receptacle thereof.

The belt drive proposed here has one or two slide rails, of which at least one slide rail has a stiff inner slide surface. This is achieved by means of the axial web described above, and possible the at least one transverse rib. In addition, the extension of the inner slide surface in the running direction may be extended in comparison to a conventional embodiment, and thus an earlier application of the inner slide surface is achieved, at least on the inlet side of the side to be guided. This improves the damping effect and thus the efficiency of the belt drive and reduces noise emissions.

According to an example embodiment of the belt drive, the maximum axial width of the inner slide surface is the same width or narrower than the side to be damped. Although a greater stiffness of the inner slide surface can be achieved with a widening of the inner slide surface, it has surprisingly been found that with the stiffening device proposed here, such stiffening of the inner slide surface can be achieved that the maximum axial width of the inner slide surface is feasibly the same width or even narrower than the side to be guided. This also makes it possible to shift the pivot axis further to the opposite side of the belt means, i.e. transversely on the inside. From this, in turn, it follows that a pivoting movement is possible which is closer to a pure rotation (change in the polar angle) about the pivot axis and thus executes a smaller transverse movement (change in the polar angle). This in turn enables an extension of the inner slide surface with the advantages mentioned above.

According to a further aspect, the disclosure relates to a drive train, having a drive assembly with an output shaft, at least one consumer and a belt drive according to an embodiment as described above. The output shaft for torque transmission by means of the belt drive can be connected with the at least one consumer with changeable transmission ratio.

The drive train is set up to transmit a torque provided by a drive assembly, for example an internal combustion engine or an electric motor, and output via the drive shaft thereof for use as required, i.e. taking into account the required speed and the required torque. One use is, for example, an electrical generator to provide electrical energy. To transmit the torque in a targeted manner and/or by means of a manual transmission with different transmission ratios, the use of the belt drive described above is particularly advantageous because a large transmission ratio spread can be achieved in a small space and the drive assembly can be operated with a small optimal speed range. Conversely, a receiving of an inertia energy introduced by, for example, a drive wheel, which then forms a drive assembly in the above definition, can be implemented by means of the belt drive on an electric generator for recuperation, i.e. the electrical storage of braking energy, with a correspondingly configured torque transmission line.

Furthermore, in an example embodiment, a plurality of drive assemblies is provided, which can be operated in series or in parallel or can be operated in a decoupled manner from one another and the torque of which can be made available as required by means of a belt drive according to the above description. Examples are hybrid drives from an electric motor and internal combustion engine, but also multi-cylinder engines in which individual cylinders (or groups of cylinders) can be activated.

The belt drive proposed here enables the use of a slide rail that efficiently uses the available installation space, so that very good damping properties can be achieved due to an increase in the stiffness of the inner slide surface. The noise emissions of such a drive train are thus reduced. The efficiency can also be increased as a result of a reduction in the vibrations. In addition, there will be reduced wear on the belt means and thus the life of the belt drive can be extended.

According to a further aspect, the disclosure relates to a motor vehicle, having at least one drive wheel which can be driven by means of a drive train according to an embodiment as described above.

Most motor vehicles today have a front-wheel drive and sometimes arrange the drive assembly, for example an internal combustion engine and/or an electric motor, in front of the driver's cab and transversely to the main direction of travel. The radial installation space is particularly small in such an arrangement, and it is therefore advantageous to use a small-sized belt drive. The use of a belt drive in motorized two-wheeled vehicles is similar, for which a significantly increased performance with the same installation space is required.

This problem is exacerbated in the case of passenger cars in the small car category according to the European classification. The assemblies used in a passenger car of the small car category are not significantly reduced in size compared to passenger cars of larger car categories. Nevertheless, the available installation space for small cars is considerably smaller.

In the motor vehicle proposed here with the drive train described above, low noise emission is achieved, which means that less effort is required with regard to sound insulation. This means that less space is required for the belt drive. It is also possible, alternatively or additionally, to set up low noise emissions and a long service life.

Passenger cars are assigned to a vehicle category according to, for example, size, price, weight, and performance, wherein this definition is subject to constant change based on the needs of the market. In the US market, vehicles in the small car and microcar categories are assigned to the sub-compact car category according to European classification, while in the British market they correspond to the super-mini car and city car categories respectively. Examples of the microcar category are a Volkswagen up! or a Renault Twingo. Examples of the small car category are an Alfa Romeo Mito, a Volkswagen Polo, a Ford Fiesta or a Renault Clio.

BRIEF DESCRIPTION OF THE DRAWINGS

The disclosure is explained in detail below based on the relevant technical background with reference to the associated drawings, which show example embodiments. The disclosure is in no way restricted by the purely schematic drawings, although it should be noted that the drawings are not dimensionally accurate and are not suitable for defining proportions. In the following.

DETAILED DESCRIPTION

Unless explicitly stated otherwise, ordinal numbers used in the previous and subsequent descriptions are used only for the purposes of clear distinction and do not indicate the order or ranking of the designated components.

Figure 1:
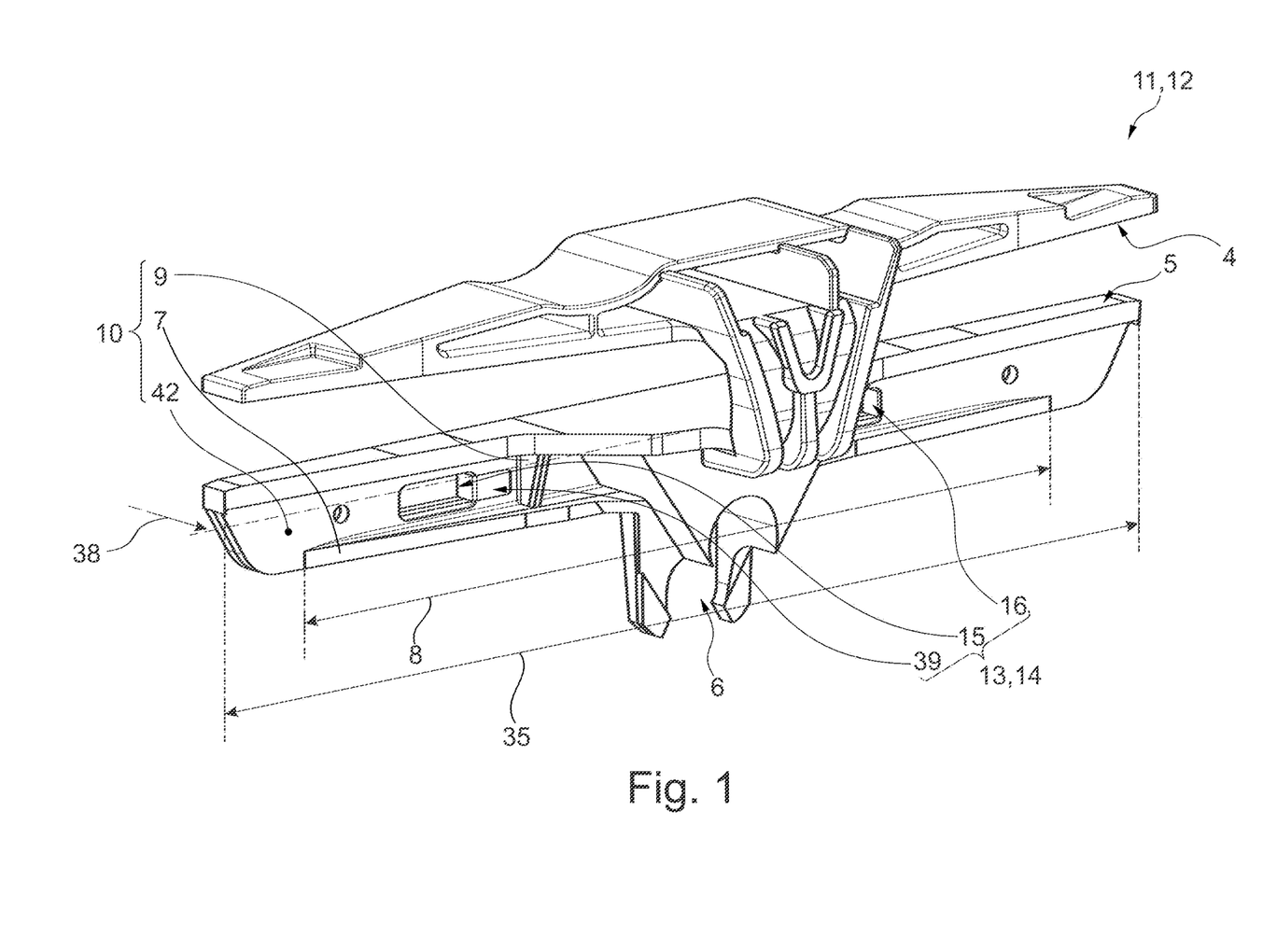
FIG. 1 shows a rail half of a slide rail.

FIG. 1 shows a first rail half 11 or a second rail half 12, which are constructed identically and can be joined together to form a slide rail 1 by means of the (bayonet-like) first closure 13 or second closure 14. For this purpose, the closure 13, 14 has a receiving opening 15, which is clearly visible here, with an undercut surface 39, behind which a connecting hook 16 (hidden here, see prior art, for example similar to that shown in WO 2014/012 741 A1, only here with one back grip tab with orientation in or against the running direction instead of a back grip tab with orientation in the transverse direction) at least in the axial direction 44 with a positive fit, possibly also with a force fit. Mounted together, the two rail halves 11 and 12 form an outer slide surface 4 (hidden here) and an inner slide surface 5.

In the transverse direction 43 inside (in accordance with the reference numerals approximately horizontal orientation of the slide surfaces 4 and 5 in the illustration below the inner slide surface 5), the support-receiving element 6 is to be ensured for a pivotable (and here also transversely movable) mounting of the slide rail 1. The inner slide surface 5 has an overall extension 35 in the running direction 17 (see FIG. 2) and a maximum axial width 38 (in the assembled state as a slide rail 1) in the area of the support-receiving element.

On the back of the inner slide surface 5 is provided a stiffening device 10, which is designed to stiffen the inner slide surface 5. In the example shown, this includes a stiffening rib 42, which here extends in the transverse direction over the entire length of the total extension 35. The stiffening rib 42 is here made axially in one piece (per rail half 11, 12) and has a rib width with an axial extension which is smaller over the entire length of the total extension 35 than the width of the inner slide surface 5. The stiffening rib 42 and thus the stiffening device 10 is delimited transversely on the inside (i.e. here in the illustration below) by means of an axial web 7. The support-receiving element 6 alone extends transversely inward beyond the axial web 7.

The axial web 7 has an extension 8 in the running direction 17 (see FIG. 2), which corresponds to slightly more than 80% of the total extension 35 of the inner slide surface 5 and is arranged approximately centrally symmetrically thereto. In the variant shown, the axial web tapers towards the inlet side 45 or outlet side 46. A transversal rib 9 is provided (on the inlet side) in the running direction 17 between the receiving opening 15 and the support-receiving element 6, which connects the inner slide surface 5 and the axial web 7 to one another in the transverse direction 43. Such a transverse rib 9 may also be provided on the outlet side.

Figure 2:
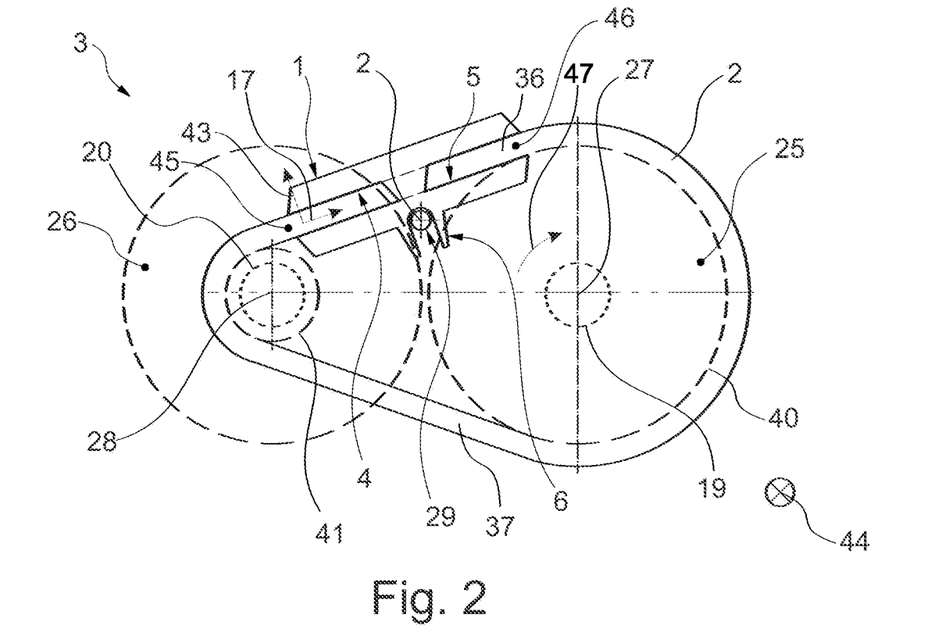
FIG. 2 shows a belt drive with a side guided by a slide rail.

FIG. 2 schematically shows a slide rail 1 in a belt drive 3, wherein a first side 36 of a belt means 2 is guided by means of the slide rail 1 and is thus damped. The belt means 2 connects a first cone pulley pair 25 to a second cone pulley pair 26 in a torque-transmitting manner. A first radius of action 40, on which the belt means 2 runs, is in contact with the first cone pulley pair 25 through a corresponding spacing in the axial direction 44 (corresponding to the orientation of the rotation axes 27 and 28), which here for example is rotatably connected in a torque-transmitting manner with a drive input shaft 19 around a first axis of rotation 27. A second radius of action 41, on which the belt means 2 runs, is in contact with the second cone pulley pair 26 through a corresponding spacing in the axial direction 44, which here for example is rotatably connected in a torque-transmitting manner with a drive output shaft 20 around a second axis of rotation 28.

Between the two cone pulley pairs 25 and 26, the first side 36 (shown here) and the second side 37 are shown in an ideal tangential orientation, so that the parallel direction of the running direction 17 is established. The transverse direction 43 shown here is defined as the third spatial axis perpendicular to the running direction 17 and perpendicular to the axial direction 44, wherein this is understood as a co-moving coordinate system. Therefore, both the running direction 17 shown and the transverse direction 43 apply only to the slide rail 1 shown and the first side 36, and only in the case of the set first radius of action 40 and corresponding second radius of action 41 shown.

The slide rail 1, with the outer slide surface 4 thereof and the inner slide surface 5 thereof, is applied to the first side 36 of the belt means 2. So that the slide surfaces 4 and 5 can follow the variable tangential orientation, i.e. the running direction 17, when the radii of action 40 and 41 change, the support-receiving element 6 is mounted on a pivoting means 29 with a pivot axis 21, for example a conventional holding tube. As a result, the slide rail 1 is mounted so as to be pivotable about the pivot axis 21. The pivoting movement in the exemplary embodiment shown is composed of a superposition of a pure angular movement and a transverse movement, so that, in deviation from a movement along a circular path, a movement along an oval (steeper) curved path occurs.

In the direction of rotation 47 shown by way of example, and when the torque is input via the drive input shaft 19, the slide rail in the illustration forms the inlet side 45 on the left and the outlet side 46 on the right. When running as a CVT, the first side 36 then forms the load side as the driving side and the second side 37 forms the empty side or slack side. In one embodiment of the belt means 2 where it is designed as a thrust link belt, under otherwise identical conditions either the first side 36 is guided as an empty side by means of the slide rail 1; the direction of rotation 36 and the running direction 17 are reversed when torque is input via the first cone pulley pair 25; or the drive output shaft 41 and the drive input shaft 40 are interchanged, so that the second cone pulley pair 26 forms the torque input.

Figure 3:
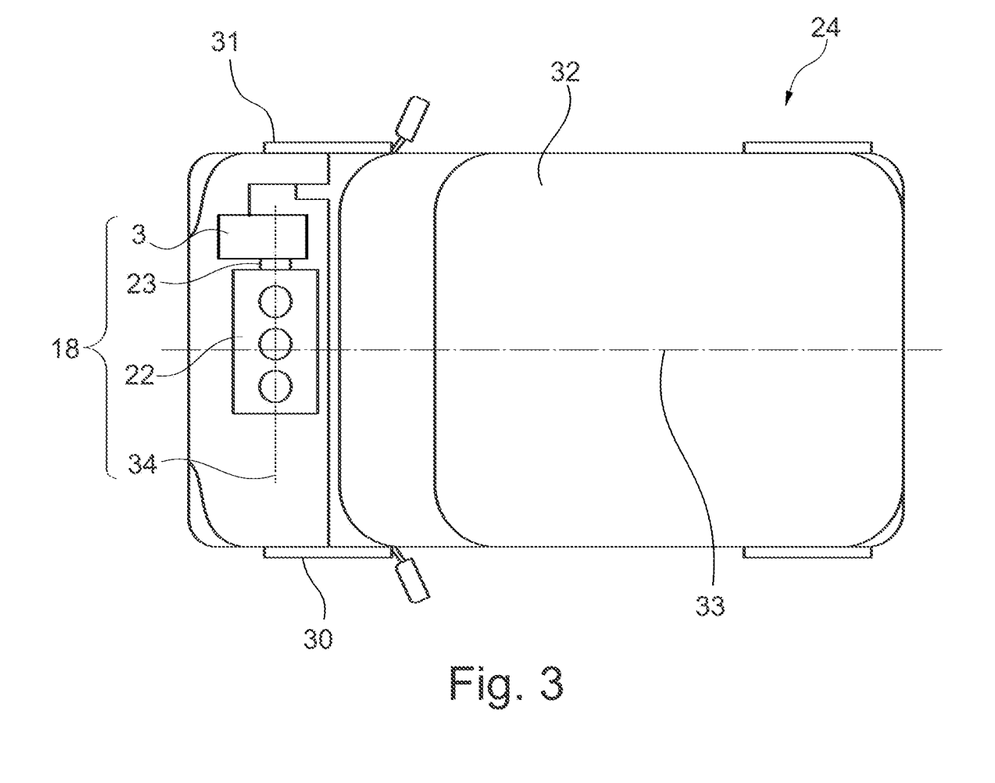
FIG. 3 shows a drive train in a motor vehicle with a belt drive.

FIG. 3 shows a drive train 18 arranged in a motor vehicle 24 with the motor axis 34 thereof transverse to the longitudinal axis 33 in front of the driver's cab 32. Here, the belt drive 3 is connected on the input side to the output shaft 23 of a drive assembly 22. On the output side, the belt drive 3 is connected to a purely schematically illustrated output, so that here a left drive wheel 30 and a right drive wheel 31 are supplied with torque by the drive assembly 22 with a variable transmission ratio. The drive assembly 22 is here purely by way of example shown as a three-cylinder internal combustion engine.

The slide rail proposed here enables reduced noise emission and improved efficiency as a result of a spatially favorable stiffening of the inner slide surface.

REFERENCE NUMERALS

1 Slide rail
2 Belt means

3 Belt drive
4 Outer slide surface
5 Inner slide surface
6 Support-receiving element
7 Axial web
8 Extension
9 Transverse rib
10 Stiffening device
11 First rail half
12 Second rail half
13 First closure
14 Second closure
15 Receiving opening
16 Connecting hooks
17 Running direction
18 Drive train
19 Drive input shaft
20 Drive output shaft
21 Pivot axis
22 Drive assembly
23 Output shaft
24 Motor vehicle
25 First cone pulley pair
26 Second cone pulley pair
27 First axis of rotation
28 Second axis of rotation
29 Pivoting means
30 Left drive wheel
31 Right drive wheel
32 Driver's cab
33 Longitudinal axis
34 Motor axis
35 Total extension
36 First side
37 Second side
38 Maximum width
39 Undercut surface
40 First radius of action
41 Second radius of action
42 Stiffening rib
43 Transverse direction
44 Axial direction
45 Inlet side
46 Outlet side
47 Direction of rotation

The invention claimed is:

1. A slide rail for damping a first side of a belt means of a belt drive, comprising:
an outer slide surface;
an inner slide surface oriented parallel to, and away from, the outer slide surface, the inner slide surface comprising:
an axial width;
a rear side; and
an overall extension in a running direction of the belt means;
a stiffening device disposed on the rear side for stiffening the inner slide surface, the stiffening device comprising:
a stiffening rib extending from the inner slide surface in a transverse direction over the overall extension, the stiffening rib having an axial width less than the inner slide surface axial width; and
an axial web with an axial extension, the axial web delimiting the stiffening rib transversely on an inside and comprising a variable axial width that tapers to a reduced axial width towards an inlet side or an outlet side of the slide rail; and
a support-receiving element designed to orient the outer slide surface and the inner slide surface to damp the first side.

2. The slide rail of claim 1 further comprising a transverse rib connecting the inner slide surface to the axial web.

3. The slide rail of claim 2 wherein:
the slide rail comprises a first rail half and a second rail half;
the first rail half and the second rail half are constructed identically, each rail half forming one half of the outer slide surface and one half of the inner slide surface;
the first rail half and the second rail half each comprise a receiving opening and a corresponding connecting hook for forming two bayonet-type closures for connecting the first rail half to the second rail half; and
the transverse rib extends in a running direction of the slide rail between the support-receiving element and the receiving opening.

4. The slide rail of claim 3, wherein:
the axial web extends over at least 80% of the total extension of the inner slide surface; and
the axial web is straight.

5. The slide rail of claim 4, wherein the axial web is arranged centrally symmetrically to the inner slide surface.

6. The slide rail of claim 3 wherein the connecting hook is oriented in the running direction or against the running direction.

7. A belt drive for a drive train, comprising:
a drive input shaft with a first cone pulley pair;
a drive output shaft with a second cone pulley pair;
the belt means connecting the first cone pulley pair to the second cone pulley pair in a torque-transmitting manner; and
the slide rail of claim 1 arranged on the first side of the belt means for damping the belt means with the inner slide surface and the outer slide surface.

8. The belt drive of claim 7, wherein a maximum axial width of the inner slide surface is less than or equal to the first side.

9. A drive train comprising:
the belt drive of claim 7;
a drive assembly comprising a drive shaft; and
a consumer connected to the drive shaft with a changeable transmission ratio by the belt drive.

10. A motor vehicle comprising a drive wheel driven by the drive train of claim 9.

11. A belt drive assembly for a drive train comprising:
a drive input shaft with a first cone pulley pair;
a drive output shaft with a second cone pulley pair;
a chain or a belt connecting the first cone pulley pair to the second cone pulley pair for torque transmission;
a slide rail for damping a first side of the chain or the belt, the slide rail being arranged on the chain, the slide rail comprising:
a first rail half comprising:
a first outer slide surface arranged on an outer surface of the chain;
a first inner slide surface oriented parallel to, and away from, the first outer slide surface, arranged on an inner surface of the chain, and comprising:
an axial width;
a rear side; and
an overall extension in a running direction of the chain or the belt;

a stiffening device disposed on the rear side for stiffening the inner slide surface, the stiffening device comprising:
   a first stiffening rib extending from the inner slide surface in a transverse direction over the overall extension, the stiffening rib having an axial width less than the inner slide surface axial width; and;
   a first axial web arranged on a portion of the rear side, the first axial web comprising an axial extension delimiting the stiffening rib transversely on an inside and comprising a variable axial width that tapers to a reduced axial width towards an inlet side or an outlet side of the slide rail; and
   a first support-receiving element arranged inside of the first inner slide surface, the first support-receiving element designed to orient the first outer slide surface and the first inner slide surface to damp the first side.

12. The belt drive assembly of claim 11 wherein the first axial web comprises an axial web extension and the axial web extension is at least eighty percent (80%) of the overall extension.

13. The belt drive assembly of claim 11 further comprising a pivot disposed in the first support receiving element.

14. The belt drive assembly of claim 11 wherein the first rail half comprises a transverse rib extending from the first inner slide surface to the first axial web.

15. The belt drive assembly of claim 14 wherein the first rail half comprises a first receiving opening for a bayonet connection extending through the first stiffening rib and the transverse rib is disposed on the first stiffening rib between the first support-receiving element and the first receiving opening.

16. The belt drive assembly of claim 11 wherein the slide rail further comprises a second rail half, wherein:
   the first rail half comprises a first connecting hook and a first receiving opening; and
   the second rail half comprises a second receiving opening and a second connecting hook disposed in the first receiving opening; and
   the first connecting hook is disposed in the second receiving opening.

17. The belt drive assembly of claim 16 wherein the second rail half has a same shape as the first rail half.

* * * * *